US012688204B2

(12) United States Patent
Ding et al.

(10) Patent No.: US 12,688,204 B2
(45) Date of Patent: Jul. 21, 2026

(54) HYBRID TRANSACTIONAL/ANALYTICAL PROCESSING (HTAP) DATABASE WITH SHARED SMART STORAGE FOR MULTIPLE TENANTS

(71) Applicants: Lemon Inc., Grand Cayman (KY); Douyin Vision Co., Ltd., Beijing (CN)

(72) Inventors: Yonghua Ding, Los Angeles, CA (US); Ye Liu, Los Angeles, CA (US); Le Cai, Los Angeles, CA (US); Gang Liao, Beijing (CN); Xiaofeng Bao, Los Angeles, CA (US); Fangshi Li, Los Angeles, CA (US); Mingyi Zhang, Los Angeles, CA (US); Shicai Zeng, Beijing (CN); Xu Wang, Beijing (CN); Jianjun Chen, Los Angeles, CA (US)

(73) Assignees: Lemon Inc., Grand Cayman (KY); Douyin Vision Co., Ltd., Beijing (CN)

( * ) Notice: Subject to any disclaimer, the term of this patent is extended or adjusted under 35 U.S.C. 154(b) by 69 days.

(21) Appl. No.: 18/812,373

(22) Filed: Aug. 22, 2024

(65) Prior Publication Data

US 2026/0056972 A1    Feb. 26, 2026

(51) Int. Cl.
G06F 16/20 (2019.01)
G06F 16/21 (2019.01)
G06F 16/25 (2019.01)
G06F 16/27 (2019.01)
G06F 16/28 (2019.01)
(Continued)

(52) U.S. Cl.
CPC ............ *G06F 16/28* (2019.01); *G06F 16/219* (2019.01); *G06F 16/256* (2019.01); *G06F 16/278* (2019.01); *G06F 16/2379* (2019.01); *G06F 16/2455* (2019.01); *G06F 16/27* (2019.01); *G06F 16/283* (2019.01)

(58) Field of Classification Search
CPC ............... G06F 16/219; G06F 16/2379; G06F 16/2455; G06F 16/256; G06F 16/27; G06F 16/278; G06F 16/28; G06F 16/283
See application file for complete search history.

(56) References Cited

U.S. PATENT DOCUMENTS 9,064,013 B1* 6/2015 Gay .................... H04L 67/1001
11,789,936 B2 10/2023 Chen et al.
(Continued)

OTHER PUBLICATIONS

Chen, J. et al., "ByteHTAP: ByteDance's HTAP System with High Data Freshness and Strong Data Consistency," Proceedings of the VLDB Endowment, vol. 15, No. 12, Aug. 1, 2022, 14 pages.
(Continued)

*Primary Examiner* — Diedra McQuitery
(74) *Attorney, Agent, or Firm* — Alleman Hall LLP

(57) ABSTRACT

A hybrid transactional/analytical processing (HTAP) database includes an online transaction processing (OLTP) engine, an online analytical processing (OLAP) engine provided separately from the OLTP engine, and a shared storage holding data of multiple tenants. The shared storage is configured to receive a request for a first scan from a first tenant and a request for a second scan from a second tenant, execute the first scan, and after a predetermined first period of time has elapsed without the first scan finishing, pause the first scan and execute the second scan.

20 Claims, 5 Drawing Sheets

(51) Int. Cl.
   *G06F 16/23*       (2019.01)
   *G06F 16/2455*    (2019.01)

(56)                References Cited

U.S. PATENT DOCUMENTS

| | | | |
|---|---|---|---|
| 2020/0012645 A1* | 1/2020 | Collins | ............. G06F 16/24542 |
| 2023/0066540 A1* | 3/2023 | Chen | .................... G06F 16/278 |

OTHER PUBLICATIONS

European Patent Office, Extended European Search Report Issued in Application No. 25179731.2, Nov. 20, 2025, Germany, 8 pages.
Zhang, C. et al., "Htap Databases: A Survey," IEEE Transactions on Knowledge and Data Engineering, vol. 36, No. 11, Apr. 19, 2024, 20 pages.
Cao, W. et al., "PolarDB-X: An Elastic Distributed Relational Database for Cloud-Native Applications," Proceedings of the 2022 IEEE 38th International Conference on Data Engineering (ICDE), May 9, 2022, Kuala Lumpur, Malaysia, 14 pages.
Yang, C., "About Database Kernel | PolarDB HTAP Serverless: Build a Cost-efficient Real-Time Analysis System," Alibaba Cloud, Available Online at https://www.alibabacloud.com/blog/about-database-kernel-%7C-polardb-htap-serverless-build-a-cost-efficient-real-time-analysis-system_600732, Jan. 4, 2024, 14 pages.

* cited by examiner

FIG. 2

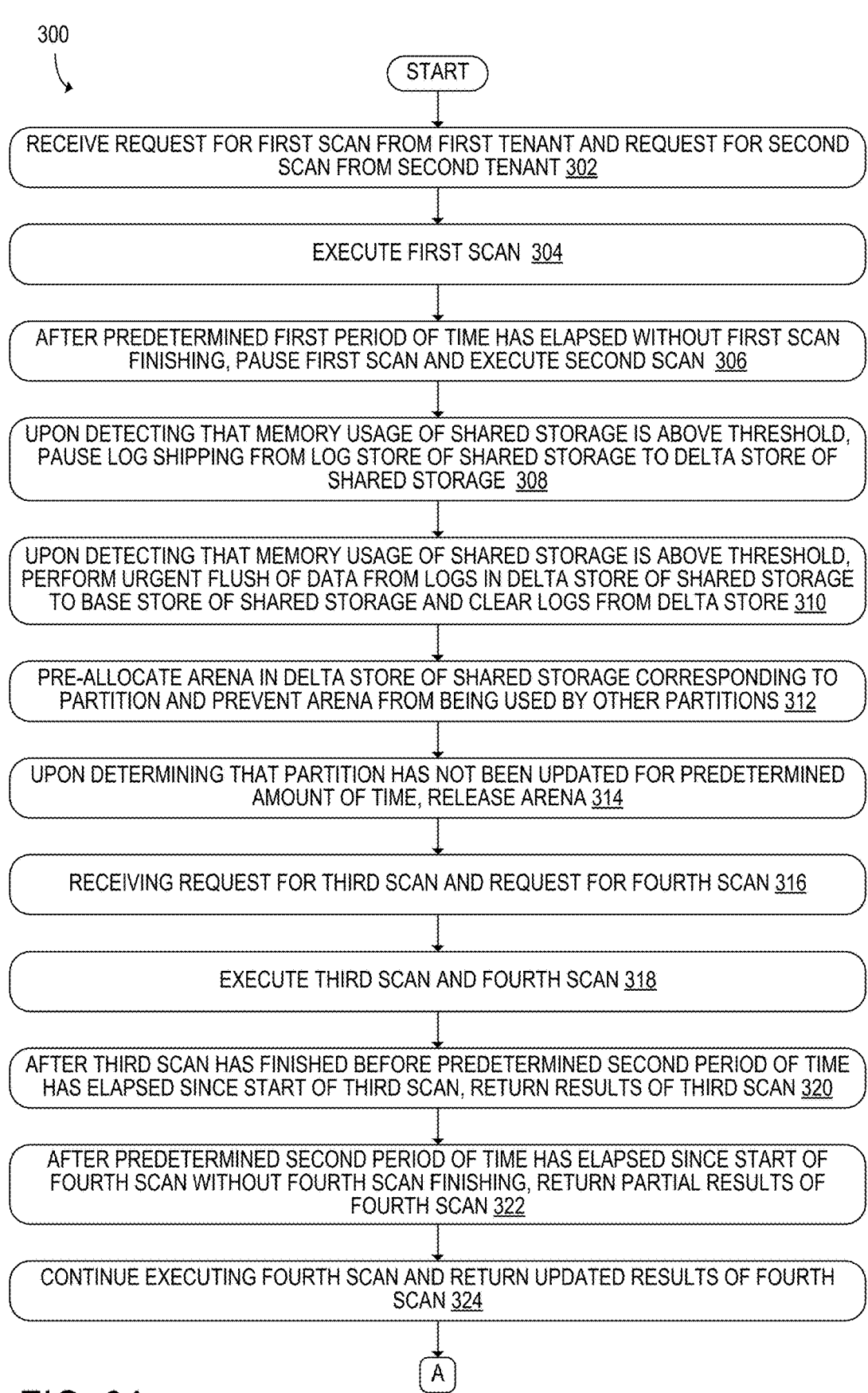

300

START

RECEIVE REQUEST FOR FIRST SCAN FROM FIRST TENANT AND REQUEST FOR SECOND SCAN FROM SECOND TENANT 302

EXECUTE FIRST SCAN 304

AFTER PREDETERMINED FIRST PERIOD OF TIME HAS ELAPSED WITHOUT FIRST SCAN FINISHING, PAUSE FIRST SCAN AND EXECUTE SECOND SCAN 306

UPON DETECTING THAT MEMORY USAGE OF SHARED STORAGE IS ABOVE THRESHOLD, PAUSE LOG SHIPPING FROM LOG STORE OF SHARED STORAGE TO DELTA STORE OF SHARED STORAGE 308

UPON DETECTING THAT MEMORY USAGE OF SHARED STORAGE IS ABOVE THRESHOLD, PERFORM URGENT FLUSH OF DATA FROM LOGS IN DELTA STORE OF SHARED STORAGE TO BASE STORE OF SHARED STORAGE AND CLEAR LOGS FROM DELTA STORE 310

PRE-ALLOCATE ARENA IN DELTA STORE OF SHARED STORAGE CORRESPONDING TO PARTITION AND PREVENT ARENA FROM BEING USED BY OTHER PARTITIONS 312

UPON DETERMINING THAT PARTITION HAS NOT BEEN UPDATED FOR PREDETERMINED AMOUNT OF TIME, RELEASE ARENA 314

RECEIVING REQUEST FOR THIRD SCAN AND REQUEST FOR FOURTH SCAN 316

EXECUTE THIRD SCAN AND FOURTH SCAN 318

AFTER THIRD SCAN HAS FINISHED BEFORE PREDETERMINED SECOND PERIOD OF TIME HAS ELAPSED SINCE START OF THIRD SCAN, RETURN RESULTS OF THIRD SCAN 320

AFTER PREDETERMINED SECOND PERIOD OF TIME HAS ELAPSED SINCE START OF FOURTH SCAN WITHOUT FOURTH SCAN FINISHING, RETURN PARTIAL RESULTS OF FOURTH SCAN 322

CONTINUE EXECUTING FOURTH SCAN AND RETURN UPDATED RESULTS OF FOURTH SCAN 324

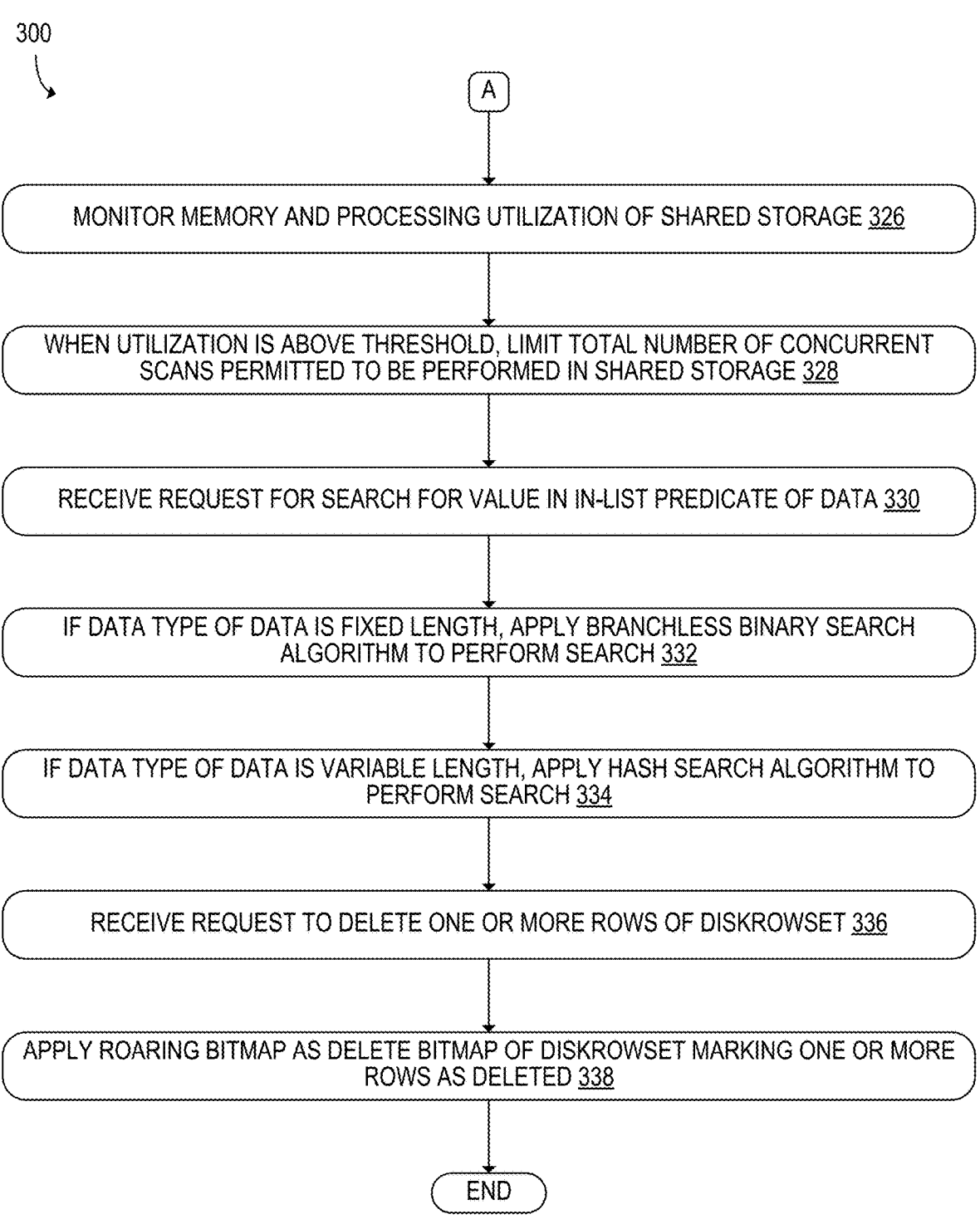

A

MONITOR MEMORY AND PROCESSING UTILIZATION OF SHARED STORAGE 326

WHEN UTILIZATION IS ABOVE THRESHOLD, LIMIT TOTAL NUMBER OF CONCURRENT SCANS PERMITTED TO BE PERFORMED IN SHARED STORAGE 328

RECEIVE REQUEST FOR SEARCH FOR VALUE IN IN-LIST PREDICATE OF DATA 330

IF DATA TYPE OF DATA IS FIXED LENGTH, APPLY BRANCHLESS BINARY SEARCH ALGORITHM TO PERFORM SEARCH 332

IF DATA TYPE OF DATA IS VARIABLE LENGTH, APPLY HASH SEARCH ALGORITHM TO PERFORM SEARCH 334

RECEIVE REQUEST TO DELETE ONE OR MORE ROWS OF DISKROWSET 336

APPLY ROARING BITMAP AS DELETE BITMAP OF DISKROWSET MARKING ONE OR MORE ROWS AS DELETED 338

END

FIG. 3B

HYBRID TRANSACTIONAL/ANALYTICAL PROCESSING (HTAP) DATABASE WITH SHARED SMART STORAGE FOR MULTIPLE TENANTS

BACKGROUND

Databases are designed with various types of architecture. Online transaction processing (OLTP) architecture is oriented toward processing transactions. Like with a bank account, transactions tend to be simple and numerous, and may include queries such as read, insert, update, delete, etc. However, OLTP architecture lacks massively parallel processing (MPP) capability. In contrast, online analytical processing (OLAP) architecture is oriented toward processing data analysis. Queries handled by OLAP architecture tend to be more complex, involve more data, and take more time to complete. For example, OLAP architecture may be responsible for determining an average sale price over the past year of a particular product tracked by the database. Many database users have use for both types of processing using the same data, and thus a hybrid transactional/analytical processing (HTAP) database has been developed which includes both types of architecture in a single database.

However, ensuring data freshness when performing complex queries with the expectation of real-time results can present a problem, since OLAP systems typically update data periodically. Furthermore, an HTAP database may support multiple tenants, which can lead to burst concurrent workloads impacting the performance of, or even crashing, the database at times when resource usage is high. Simply adding more resources may be expensive, and therefore providing multi-tenancy support in an HTAP database in a cost-effective manner is not straightforward.

SUMMARY

To address these issues, a hybrid transactional/analytical processing (HTAP) database is provided herein that includes an online transaction processing (OLTP) engine, an online analytical processing (OLAP) engine, and a shared storage holding data of multiple tenants, the shared storage being separate from the OLTP engine and the OLAP engine. The shared storage may be configured to receive a request for a first scan from a first tenant and a request for a second scan from a second tenant, execute the first scan, and after a predetermined first period of time has elapsed without the first scan finishing, pause the first scan and execute the second scan.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 illustrates detailed operation of a shared storage of the HTAP database of FIG. 1.

FIGS. 3A-B show an example flowchart of a data processing method for an HTAP database according to one example of the present disclosure.

DETAILED DESCRIPTION

Figure 1:
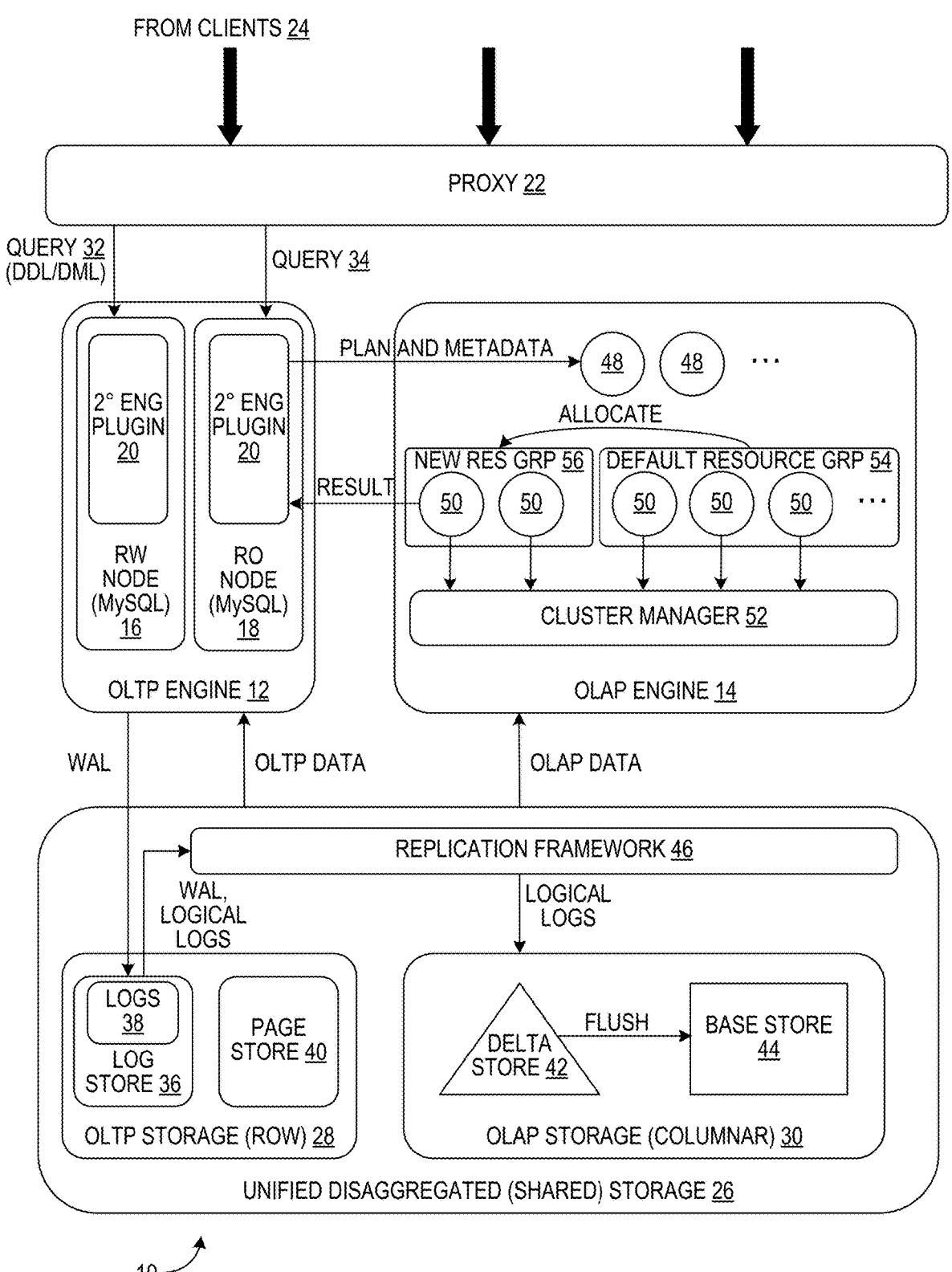
FIG. 1 illustrates a hybrid transactional/analytical processing (HTAP) database according to one example of the present disclosure.

FIG. 1 illustrates a hybrid transactional/analytical processing (HTAP) database 10 according to one example of the present disclosure. The HTAP database 10 may be hybridized in the sense that it includes both an online transaction processing (OLTP) engine 12 and an online analytical processing (OLAP) engine 14, which may be provided separately from the OLTP engine 12. That is, the HTAP database 10 may include separated compute engines. Keeping the two engines 12, 14 separate may allow each separate engine 12, 14 to exhibit peak performance for their respective workloads for which they are specialized while avoiding interference therebetween. Examples of HTAP databases with unified engines include SAP HANA and MEMSQL, and examples with separate engines include WILDFIRE and TIDB.

The OLTP engine 12 may include a read-write (RW) node 16 and a read-only (RO) node 18. Each node 16, 18 may include a respective secondary engine plugin 20, which is an extension that allows a proxy 22 to send all queries from clients 24 to the OLTP engine 12 and allow the OLTP engine 12 to determine which engine 12, 14 to use for a given query based on a variety of parameters such as query complexity. For example, data manipulation language (DML) queries and data definition language (DDL) queries may be sent only to the RW node 16, while other types of queries can be handled by either node 16, 18. By directing queries in this manner rather than at the proxy 22, the database 10 can support a read committed isolation level across both engines 12, 14, thereby guaranteeing the same results from either. For decreased latency, users may be given the option of sending queries directly to the OLAP engine 14 when the final destination is known from the start.

In contrast to the separate engines 12, 14, the HTAP database 10 may include a shared storage 26 holding data of multiple tenants. The shared storage 26 may be shared in the sense that it includes both an OLTP storage 28 holding data in row format for responding to queries of the OLTP engine 12, and an OLAP storage 30 holding data in column format for responding to queries of the OLAP engine 14. Typically, systems with separate compute engines also include separate storage, which commonly has low data freshness for OLAP queries.

The HTAP database 10 may be configured to support one unified application programming interface (API) and automatically route queries from the clients 24 to the OLTP engine 12 and OLAP engine 14 using the proxy 22. On a basic level, DML queries, DDL queries, simple queries, and queries otherwise suitable for OLTP (e.g., with predicates over indexes on OLTP tables) are included in queries 32 that are routed to the OLTP engine 12, while complex queries, such as those with multiple joins and aggregations, are included in queries 34 that are routed to the OLAP engine 14. In this manner, interference between OLTP and OLAP workloads is avoided while queries are performed by the appropriate engine 12, 14.

The OLTP storage 28 may include a log store 36 configured to persist logs 38 and a page store 40 configured to store versions of data pages and apply the logs 38 to construct current versions of the data pages. The logs 38 may include various types of logs, such as redo logs, logical logs, and write-ahead logs (WAL). The page store 40 may use redo logs to construct the data pages, while logical logs such as MYSQL binary logs for committed DML transactions may be passed on to the OLAP storage 30. The OLAP storage 30 may include a delta store 42 configured to record changes made to the OLTP storage 28, and a base store 44 configured to implement updates from the delta store 42 in persistent storage. Although the OLAP storage 30 as a whole may be columnar, it will be appreciated that the delta store 42 may store changes in row format until the changes are implemented to the base store 44 in column format. The delta store 42 may be in-memory while the base store 44 may be on-disk.

In order to ensure data freshness of the base store 44 for OLAP queries, the OLAP storage 30 may further include a replication framework 46 configured to perform log shipping of the logs 38 from the log store 36 to the delta store 42. In particular, the replication framework 46 may ship logical logs to the OLAP storage 30. The replication framework 46 may distribute the logs 38 to multiple storage nodes for each partition to build a columnar data store residing on different storage nodes from its corresponding row store.

The OLAP engine 14 may include a plurality of coordinators 48 for distributed plan generation and optimization, and a plurality of data servers 50 for distributed plan execution. A centralized cluster manager 52 may allow users to create resource groups out of the data servers 50, and may allocate data servers 50 from a default resource group 54 to a new resource group 56 as needed according to workload. For processing the query 34 at the OLAP engine 14, the secondary engine plugins 20 may generate a MYSQL-compatible query plan and perform simple optimizations before sending the partially optimized query plan, together with required metadata, to the coordinators 48 for distributed plan generation and optimization. After optimization, a co-located query scheduler may send fragment of the plan to a set of the data servers 50 for execution, which may read the data from the OLAP storage 30 and periodically send heartbeats to the cluster manager 52. The final result from the query may be buffered at one of the data servers 50 and fetched by the secondary engine plugins 20.

On a basic level, the OLTP engine 12, OLAP engine 14, and shared storage 26 may be made up of a plurality of servers working together to form a compute layer (e.g., the OLTP engine 12 and the OLAP engine 14) and a storage layer (e.g., the shared storage 26). In one example, the HTAP database 10 includes a plurality of clusters managed by the cluster manager 52, and each cluster includes six database servers, with four data servers 50 forming the OLAP engine 14 of that cluster and one RW node 16 and one RO node forming the OLTP engine 12 of that cluster. The shared storage 26 may include a plurality of storage servers, for example, three per cluster. It will be appreciated that this is merely one example and other suitable numbers of machines may be utilized.

Figure 2:
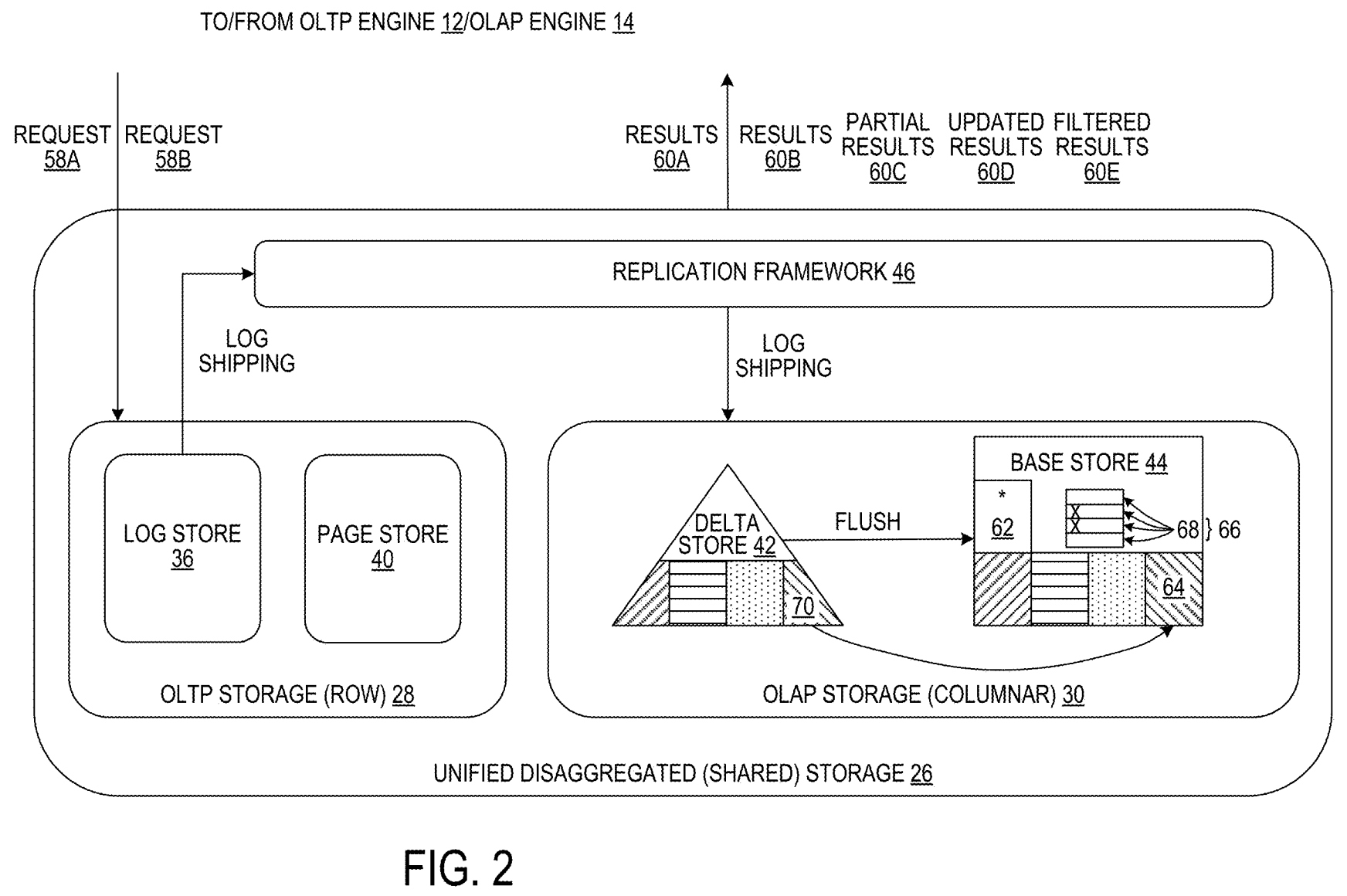

FIG. 2 shows the shared storage 26 for the purpose of illustrating more detailed operation thereof. Due to the multi-tenant support and separate compute, shared storage architecture, the HTAP database 10 may be configured to perform several resource management techniques in order to accommodate concurrent workloads while avoiding resource shortages.

One technique that may be employed is fairness scheduling. The shared storage 26 may be configured to receive a request 58A for a first scan from a first tenant and a request

58B for a second scan from a second tenant. It will be appreciated that a plurality of requests may be received. Fair scheduling for concurrent scan jobs may include categorizing the scans based on priorities into different resource groups. Within each group, long-running jobs may be temporarily paused to allow short-running jobs the opportunity to run. Thus, the shared storage 26 may be configured to execute the first scan, and after a predetermined period of time has elapsed without the first scan finishing, pause the first scan and execute the second scan. Thus, the shared storage 26 may be able to return results 60B from the second scan before results 60A from the first scan. The added cost when switching between scans occurs due to restoring scan iteration information (e.g., a few microseconds). Therefore, the predetermined period of time should be set for a time period that is significantly longer than the restoration takes, yet shorter than the average duration of most jobs, in order to find a balance between response time and the cost of switching context. In one example, the predetermined period of time is set between 10-100 ms, which prevents undue delays to short-running queries.

Another technique that may be employed is the use of a scan deadline. Typically, a scan job completes either when it finishes naturally or when its return buffer is full. However, high filter-rate scan jobs may require long periods of time to fill their return buffer, leading to long wait times. Here, the shared storage 26 may be configured to receive the request 58A for a first scan and the request 58B for a second scan, and execute the first scan and the second scan. As opposed to the pause instituted under fairness scheduling, this time, the shared storage may be configured to, after the first scan has finished before a predetermined period of time has elapsed since a start of the first scan, return the results 60A of the first scan, and after the predetermined period of time has elapsed since a start of the second scan without the second scan finishing, return partial results 60C of the second scan. Later, the shared storage 26 may be configured to continue executing the second scan and return updated results 60D of the second scan. That is, a scan deadline may be imposed in the form of a predetermined period of time, after which incomplete jobs may return partial results. Particularly long jobs may return partial results multiple times. In one example, the predetermined period of time may be set based on the job's runtime and the quantity of data already returned. Accordingly, network timeouts and underutilization of data server 50 resources can be prevented. The fairness scheduling and/or scan deadlines can be imposed to avoid starvation of queries.

Several adaptive computation techniques may help with resource management. In some cases, the HTAP database 10 may implement quality of service (QoS) controls on various aspects. For example, QoS on log shipping can avoid system crashes due to out of memory (OOM) issues from the delta store 42. In this example, the shared storage 26 may be configured to, upon detecting that memory usage of the shared storage 26 is above a threshold, pause the log shipping described above from the log store 36 to the delta store 42. Instead, newly committed logs in the delta store 42 may be held until memory usage is alleviated and the log shipping can be resumed. The threshold may be, for example, 90% of total memory capacity. In another example, QoS on scans can avoid system crashes due to OOM issues during times of burst concurrent scan requests and also improve the overall system throughput. In this example, the shared storage 26 may be configured to monitor memory and processing utilization of the shared storage, and when the utilization is above a threshold, limit a total number of concurrent scans permitted to be performed in the shared storage 26. If the utilization is over the threshold for processing and/or memory, an incoming scan may be delayed with a busy message until the utilization subsides. Thus, the total number of scans can be dynamically adjusted based on the resource consumption level.

Another adaptive computation technique that may be utilized is urgent flush and garbage collection. In this example, the shared storage 26 may be configured to, upon detecting that memory usage of the shared storage is above a threshold, perform an urgent flush of data from the logs in the delta store 42 to the base store 44 and clear the logs from the delta store 42. The delta store 42 in memory serves as a bridge between committed data in the OLTP storage 28 and columnar data in the OLAP storage 30, and may consume a large volume of memory when the storage is both shared between OLAP and OLTP. Thus, this technique can quickly reduce memory consumption on demand, rather than waiting for the normal flush triggers used in times when memory is not needed urgently. Each of these techniques can be used to build a safety net in the shared storage 26 to avoid system crashes overcommitments of resources even when handling concurrent workloads from multiple tenants.

Coming from another direction, several techniques for optimizing memory and processing utilization may be employed to increase cost-effectiveness and performance of the HTAP database 10. According to one technique, the shared storage 26 may be configured to store at least one column index 62. Suitable examples of the column index 62 may include zonemap, bitmap, and bloomfilter. When a predicate column is defined as the column index 62, the predicate can be evaluated using the column index 62 to filter data more efficiently, reducing the associated processing cost to perform the evaluation. The column index 62 can accelerate scans with predicate pushdowns, improve scan performance, and increase cost-effectiveness of the shared storage 26.

Another technique relates to IN-list predicate evaluation. When the shared storage 26 receives the request 58A, the request 58A may be for a search for a value in an IN-list predicate of data, e.g., by use of "IN" or "%INLIST." As illustrated in FIG. 2, the base store 44 may be divided into different partitions 64 having different data. For the IN-list predicate, if a data type of the data is fixed length such as various integer data types, the shared storage 26 may be configured to apply a branchless binary search algorithm to perform the search. On the other hand, if the data type of the data is variable length such as string and varchar, the shared storage 26 may be configured to apply a hash search algorithm to perform the search. The branchless binary search has a low data comparison cost and has fewer branch miss-predictions for fixed length data types and therefore shows improved performance over hash search and binary search from a C/C++ library.

In some cases, the shared storage 26 may be configured to perform predicate pushdowns, that is, perform filtering computations within the storage layer so that the returned results (e.g., filtered results 60E) require less processing at the compute layer. In such a case, when the shared storage 26 receives the requests 58A and 58B, they may be a request for a first predicate pushdown and a request for a second predicate pushdown, respectively. Of course, more than two predicate pushdowns may be requested. The shared storage 26 may be configured to determine an evaluation order of the first and second predicate pushdowns according to set rules. For example, if the first predicate pushdown has an equal (=) and the second predicate pushdown has an IN-list, then the first predicate pushdown is performed first since its cost is lower. Thus, the set rules may be based on processing cost so that lower cost pushdown requests are processed first. The set rules may further take filter rates into account when determining the evaluation order.

Another technique relates to delete bitmaps. A table of data may include one or more DiskRowSet 66 formed of individual rows 68. The shared storage 26 may be configured to receive the request 58A, which in this case may be a request to delete one or more rows 68 of the DiskRowSet 66. Here, the shared storage 26 may be configured to apply a roaring bitmap as a delete bitmap of the DiskRowSet marking the one or more rows 68 as deleted (see the small "x" schematically marking deleted rows 68). When the DiskRowSet 66 includes no or few deleted rows 68, the memory consumption of a roaring bitmap is much lower than a normal delete bitmap in which one bit represents a row. Although fresh data in the HTAP database 10 may have a lot of deleted rows 68, after flushing to the base store 44 and compacting the flushed data, fewer deletes are maintained in the base store 44. In some cases, the use of roaring bitmaps under such conditions can reduce overall memory usage by an order of magnitude compared to normal delete bitmaps.

The final technique of the present disclosure relates to liveness aware pre-allocation. As mentioned briefly above, the base store 44 may include a plurality of partitions 64 of data. The shared storage 26 may be configured to pre-allocate an arena 70 in the delta store 42 corresponding to one of the partitions 64 and prevent the arena 70 from being used by other partitions 64. For illustrative purposes, the partitions 64 and arenas 70 here are shown with corresponding patterns. Each arena 70 may be, for example, 1 MB of buffer space. One arena 70 is normally maintained per partition 64 for use in the near future even after flushing and garbage collection is performed. However, in a multi-tenant environment, capacity for even more partitions 64 may be needed, and the partitions 64 may be updated at varying frequencies according to each tenant's usage and habits. Based on the elapsed time since the last log shipping, for example, upon determining that the partition has not been updated for a predetermined amount of time, the shared storage 26 may be configured to release the arena 70, that is, no longer hold the arena 70 for use by the associated partition 64 and allow other partitions 64 to make use of the space. Accordingly, memory usage can be easily reduced for unused partitions 64.

FIGS. 3A-B show a flowchart for a data processing method 300 for a hybrid transactional/analytical processing (HTAP) database according to the present disclosure. The method 300 may be implemented by the HTAP database 10 illustrated in FIG. 1, and performed at the shared storage 26. Thus, the HTAP database may include an online transaction processing (OLTP) engine, an online analytical processing (OLAP) engine provided separately from the OLTP engine, and a shared storage holding data of multiple tenants.

With reference to FIG. 3A, at 302, the method 300 may include receiving a request for a first scan from a first tenant and a request for a second scan from a second tenant. At 304, the method 300 may include executing the first scan. At 306, the method 300 may include, after a predetermined first period of time has elapsed without the first scan finishing, pausing the first scan and executing the second scan. Implementing fairness scheduling in this manner may prevent short jobs from running at the expense of long jobs. At 308, the method 300 may include, upon detecting that memory usage of the shared storage is above a threshold, pausing log shipping from a log store of the shared storage to a delta store of the shared storage. Implementing QoS on log shipping in this manner can avoid system crashes due to out of memory issues from the delta store. At 310, the method 300 may include, upon detecting that memory usage of the shared storage is above a threshold, perform an urgent flush of data from logs in a delta store of the shared storage to a base store of the shared storage and clear the logs from the delta store. Implementing an urgent flush and garbage collection in this manner can quickly reduce memory consumption on demand, rather than waiting for the normal flush triggers used in times when memory is not needed urgently. At 312, the method 300 may include pre-allocating an arena in a delta store of the shared storage corresponding to a partition and preventing the arena from being used by other partitions. At 314, the method 300 may include, upon determining that the partition has not been updated for a predetermined amount of time, releasing the arena. Implementing liveness aware pre-allocation in this manner can easily reduce memory usage for unused partitions.

At 316, the method 300 may include receiving a request for a third scan and a request for a fourth scan. At 318, the method 300 may include executing the third scan and the fourth scan. At 320, the method 300 may include, after the third scan has finished before a predetermined second period of time has elapsed since a start of the third scan, returning results of the third scan. At 322, the method 300 may include, after the predetermined second period of time has elapsed since a start of the fourth scan without the fourth scan finishing, returning partial results of the fourth scan. At 324, the method 300 may include continuing executing the fourth scan and returning updated results of the fourth scan. Implementing a scan deadline in this manner may prevent network timeouts and underutilization of data server resources and avoid starvation of shorter queries while still responding to longer queries.

Continuing with reference to FIG. 3B, at 326, the method 300 may include monitoring memory and processing utilization of the shared storage. At 328, the method 300 may include, when the utilization is above a threshold, limiting a total number of concurrent scans permitted to be performed in the shared storage. Implementing QoS on scans in this manner can avoid system crashes due to OOM issues during times of burst concurrent scan requests and also improve the overall system throughput. At 330, the method 300 may include receiving a request for a search for a value in an IN-list predicate of data. At 332, the method 300 may include, if a data type of the data is fixed length, applying a branchless binary search algorithm to perform the search. At 334, the method 300 may include, if the data type of the data is variable length, applying a hash search algorithm to perform the search. Implementing IN-list predicate evaluation in this manner may show improved performance over using hash search of binary search for all searches. At 336, the method 300 may include receiving a request to delete one or more rows of a DiskRowSet. At 338, the method 300 may include applying a roaring bitmap as a delete bitmap of the DiskRowSet marking the one or more rows as deleted. Implementing delete bitmaps in this manner may reduce overall memory usage by an order of magnitude compared to normal delete bitmaps.

The systems and methods disclosed herein are able to provide a hybrid database that is able to competently process both transaction and analytical queries. By employing a number of techniques for starvation avoidance, resource management, and memory and processing optimization, the shared storage of the HTAP database is able to support heavy workloads even in a multi-tenant environment.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
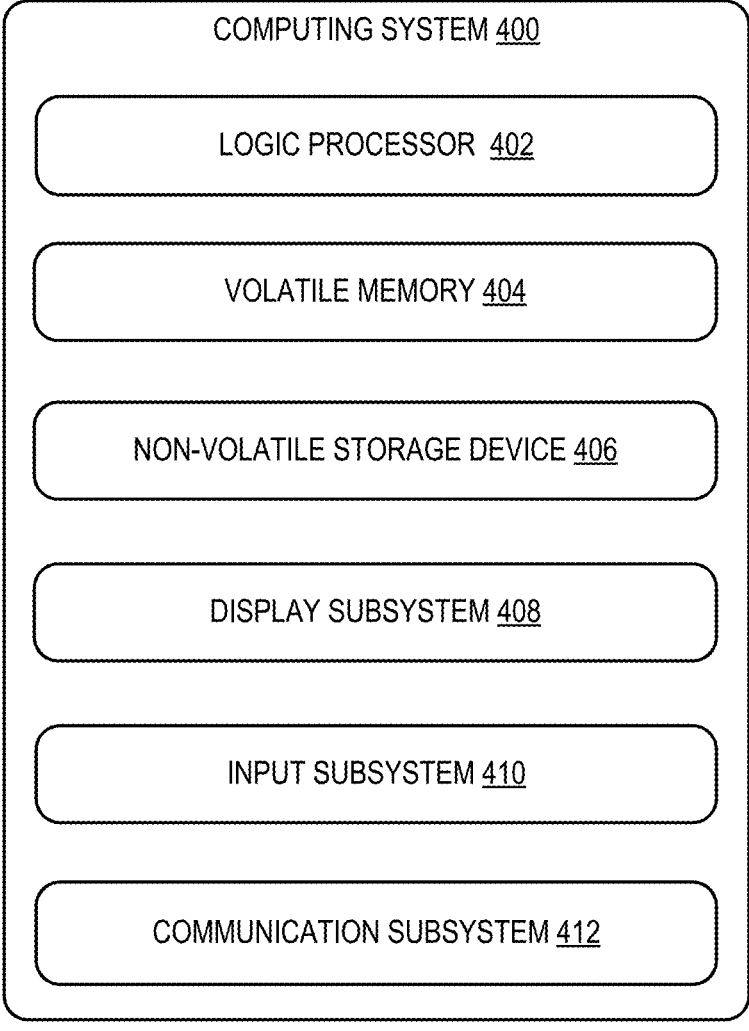
FIG. 4 shows a schematic view of an example computing environment in which the HTAP database of FIG. 1 may be enacted.

FIG. 4 schematically shows a non-limiting embodiment of a computing system 400 that can enact one or more of the methods and processes described above. Computing system 400 is shown in simplified form. Computing system 400 may embody HTAP database 10 described above and illustrated in FIG. 2. Computing system 400 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 4.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs provide additional description of the subject matter of the present disclosure. One aspect provides a hybrid transactional/analytical processing (HTAP) database. The HTAP database comprises an online transaction processing (OLTP) engine, an online analytical processing (OLAP) engine provided separately from the OLTP engine, and a shared storage holding data of multiple tenants. The shared storage is configured to receive a request for a first scan from a first tenant and a request for a second scan from a second tenant, execute the first scan, and after a predetermined first period of time has elapsed without the first scan finishing, pause the first scan and execute the second scan. In this aspect, additionally or alternatively, the shared storage comprises an OLTP storage holding data in row format for responding to queries of the OLTP engine. The OLTP storage includes a log store configured to persist logs, and a page store configured to store versions of data pages and apply the logs to construct current versions of the data pages, and an OLAP storage holding data in column format for responding to queries of the OLAP engine. The OLAP storage includes a delta store configured to record changes made to the OLTP storage, and a base store configured to implement updates from the delta store in persistent storage, and a replication framework configured to perform log shipping of the logs from the log store to the delta store. In this aspect, additionally or alternatively, the shared storage is configured to, upon detecting that memory usage of the shared storage is above a threshold, pause the log shipping from the log store to the delta store. In this aspect, additionally or alternatively, the shared storage is configured to, upon detecting that memory usage of the shared storage is above a threshold, perform an urgent flush of data from the logs in the delta store to the base store and clear the logs from the delta store. In this aspect, additionally or alternatively, the shared storage is configured to pre-allocate an arena in the delta store corresponding to a partition and prevent the arena from being used by other partitions, and upon determining that the partition has not been updated for a predetermined amount of time, release the arena. In this aspect, additionally or alternatively, the shared storage is configured to receive a request for a third scan and a request for a fourth scan, execute the third scan and the fourth scan, after the third scan has finished before a predetermined second period of time has elapsed since a start of the third scan, return results of the third scan, after the predetermined second period of time has elapsed since a start of the fourth scan without the fourth scan finishing, return partial results of the fourth scan, and continue executing the fourth scan and return updated results of the fourth scan. In this aspect, additionally or alternatively, the shared storage is configured to monitor memory and processing utilization of the shared storage, and when the utilization is above a threshold, limit a total number of concurrent scans permitted to be performed in the shared storage. In this aspect, additionally or alternatively, the shared storage is configured to store at least one column index. In this aspect, additionally or alternatively, the shared storage is configured to receive a request for a search for a value in an IN-list predicate of data, if a data type of the data is fixed length, apply a branchless binary search algorithm to perform the search, and if the data type of the data is variable length, apply a hash search algorithm to perform the search. In this aspect, additionally or alternatively, the shared storage is configured to receive a request for a first predicate pushdown and a request for a second predicate pushdown, and determine an evaluation order of the first and second predicate pushdowns according to set rules. In this aspect, additionally or alternatively, the shared storage is configured to receive a request to delete one or more rows of a DiskRowSet, and apply a roaring bitmap as a delete bitmap of the DiskRowSet marking the one or more rows as deleted.

Another aspect provides a data processing method for a hybrid transactional/analytical processing (HTAP) database including an online transaction processing (OLTP) engine, an online analytical processing (OLAP) engine provided separately from the OLTP engine, and a shared storage holding data of multiple tenants. The method comprises, at the shared storage, receiving a request for a first scan from a first tenant and a request for a second scan from a second tenant, executing the first scan, and after a predetermined first period of time has elapsed without the first scan finishing, pausing the first scan and executing the second scan. In this aspect, additionally or alternatively, the method further comprises, upon detecting that memory usage of the shared storage is above a threshold, pausing log shipping from a log store of the shared storage to a delta store of the shared storage. In this aspect, additionally or alternatively, the method further comprises, upon detecting that memory usage of the shared storage is above a threshold, perform an urgent flush of data from logs in a delta store of the shared storage to a base store of the shared storage and clear the logs from the delta store. In this aspect, additionally or alternatively, the method further comprises pre-allocating an arena in a delta store of the shared storage corresponding to a partition and preventing the arena from being used by other partitions, and upon determining that the partition has not been updated for a predetermined amount of time, releasing the arena. In this aspect, additionally or alternatively, the method further comprises receiving a request for a third scan and a request for a fourth scan, executing the third scan and the fourth scan, after the third scan has finished before a predetermined second period of time has elapsed since a start of the third scan, returning results of the third scan, after the predetermined second period of time has elapsed since a start of the fourth scan without the fourth scan finishing, returning partial results of the fourth scan, and continuing executing the fourth scan and returning updated results of the fourth scan. In this aspect, additionally or alternatively, the method further comprises monitoring memory and processing utilization of the shared storage, and when the utilization is above a threshold, limiting a total number of concurrent scans permitted to be performed in the shared storage. In this aspect, additionally or alternatively, the method further comprises receiving a request for a search for a value in an IN-list predicate of data, if a data type of the data is fixed length, applying a branchless binary search algorithm to perform the search, and if the data type of the data is variable length, applying a hash search algorithm to perform the search. In this aspect, additionally or alternatively, the method further comprises receiving a request to delete one or more rows of a DiskRowSet, and applying a roaring bitmap as a delete bitmap of the DiskRowSet marking the one or more rows as deleted.

Another aspect provides a hybrid transactional/analytical processing (HTAP) database. The HTAP database comprises an online transaction processing (OLTP) engine, an online analytical processing (OLAP) engine provided separately from the OLTP engine, and a shared storage holding data of multiple tenants. The shared storage comprises an OLTP storage holding data in row format for responding to queries of the OLTP engine, the OLTP storage including a log store configured to persist logs, and a page store configured to store versions of data pages and apply the logs to construct current versions of the data pages, and an OLAP storage holding data in column format for responding to queries of the OLAP engine, the OLAP storage including, a delta store configured to record changes made to the OLTP storage, and a base store configured to implement updates from the delta store in persistent storage, and a replication framework configured to perform log shipping of the logs from the log store to the delta store. The shared storage is configured to receive a request for a first scan from a first tenant and a request for a second scan from a second tenant, execute the first scan, after a predetermined first period of time has elapsed without the first scan finishing, pause the first scan and execute the second scan, upon detecting that memory usage of the shared storage is above a first threshold, pause the log shipping from the log store to the delta store, and upon detecting that memory usage of the shared storage is above a second threshold, perform an urgent flush of data from the logs in the delta store to the base store and clear the logs from the delta store.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A hybrid transactional/analytical processing (HTAP) database formed of a plurality of server computing devices, the HTAP database comprising:
   an online transaction processing (OLTP) engine;
   an online analytical processing (OLAP) engine provided separately from the OLTP engine; and
   a shared storage holding data of multiple tenants, wherein the shared storage is configured to:
      receive a request for a first scan from a first tenant and a request for a second scan from a second tenant;
      execute the first scan;
      after a predetermined first period of time has elapsed without the first scan finishing, pause the first scan and execute the second scan;
      monitor utilization of memory and processing of the shared storage; and
      when the utilization of at least one of the memory or the processing is above a threshold, limit a total number of concurrent scans permitted to be performed in the shared storage.

2. The HTAP database of claim 1, wherein the shared storage comprises:
   an OLTP storage holding data in row format for responding to queries of the OLTP engine, the OLTP storage including:
      a log store configured to persist logs; and
      a page store configured to store versions of data pages and apply the logs to construct current versions of the data pages; and an OLAP storage holding data in column format for responding to queries of the OLAP engine, the OLAP storage including:

a delta store configured to record changes made to the OLTP storage; and a base store configured to implement updates from the delta store in persistent storage; and a replication framework configured to perform log shipping of the logs from the log store to the delta store.

3. The HTAP database of claim 2, wherein the shared storage is configured to, upon detecting that the utilization of the memory of the shared storage is above the threshold, pause the log shipping from the log store to the delta store.

4. The HTAP database of claim 2, wherein the shared storage is configured to, upon detecting that the utilization of the memory of the shared storage is above the threshold, perform an urgent flush of data from the logs in the delta store to the base store and clear the logs from the delta store.

5. The HTAP database of claim 1, wherein the shared storage is configured to:

pre-allocate an arena in a delta store of the shared storage corresponding to a partition and prevent the arena from being used by other partitions; and upon determining that the partition has not been updated for a predetermined amount of time, release the arena.

6. The HTAP database of claim 1, wherein the shared storage is configured to:

receive a request for a third scan and a request for a fourth scan;

execute the third scan and the fourth scan;

after the third scan has finished before a predetermined second period of time has elapsed since a start of the third scan, return results of the third scan;

after the predetermined second period of time has elapsed since a start of the fourth scan without the fourth scan finishing, return partial results of the fourth scan; and continue executing the fourth scan and return updated results of the fourth scan.

7. The HTAP database of claim 1, wherein the shared storage is configured to store at least one column index.

8. The HTAP database of claim 1, wherein the shared storage is configured to:

receive a request for a search for a value in an IN-list predicate of data;

if a data type of the data is fixed length, apply a branchless binary search algorithm to perform the search; and if the data type of the data is variable length, apply a hash search algorithm to perform the search.

9. The HTAP database of claim 1, wherein the shared storage is configured to:

receive a request for a first predicate pushdown and a request for a second predicate pushdown; and determine an evaluation order of the first and second predicate pushdowns according to set rules.

10. The HTAP database of claim 1, wherein the shared storage is configured to:

receive a request to delete one or more rows of a Disk-RowSet; and apply a roaring bitmap as a delete bitmap of the Disk-RowSet marking the one or more rows as deleted.

11. A data processing method for a hybrid transactional/analytical processing (HTAP) database including an online transaction processing (OLTP) engine, an online analytical processing (OLAP) engine provided separately from the OLTP engine, and a shared storage holding data of multiple tenants, the method comprising, at the shared storage:

receiving a request for a first scan from a first tenant and a request for a second scan from a second tenant;

executing the first scan;

after a predetermined first period of time has elapsed without the first scan finishing, pausing the first scan and executing the second scan;

monitoring utilization of memory and processing of the shared storage; and when the utilization of at least one of the memory or the processing is above a threshold, limiting a total number of concurrent scans permitted to be performed in the shared storage.

12. The method of claim 11, further comprising, upon detecting that the utilization of the memory of the shared storage is above the threshold, pausing log shipping from a log store of the shared storage to a delta store of the shared storage.

13. The method of claim 11, further comprising, upon detecting that the utilization of the memory of the shared storage is above the threshold, perform an urgent flush of data from logs in a delta store of the shared storage to a base store of the shared storage and clear the logs from the delta store.

14. The method of claim 11, further comprising:

pre-allocating an arena in a delta store of the shared storage corresponding to a partition and preventing the arena from being used by other partitions; and upon determining that the partition has not been updated for a predetermined amount of time, releasing the arena.

15. The method of claim 11, further comprising:

receiving a request for a third scan and a request for a fourth scan;

executing the third scan and the fourth scan;

after the third scan has finished before a predetermined second period of time has elapsed since a start of the third scan, returning results of the third scan;

after the predetermined second period of time has elapsed since a start of the fourth scan without the fourth scan finishing, returning partial results of the fourth scan; and continuing executing the fourth scan and returning updated results of the fourth scan.

16. The method of claim 11, further comprising:

receiving a request for a search for a value in an IN-list predicate of data;

if a data type of the data is fixed length, applying a branchless binary search algorithm to perform the search; and if the data type of the data is variable length, applying a hash search algorithm to perform the search.

17. The method of claim 11, further comprising:

receiving a request to delete one or more rows of a DiskRowSet; and applying a roaring bitmap as a delete bitmap of the DiskRowSet marking the one or more rows as deleted.

18. A hybrid transactional/analytical processing (HTAP) database formed of a plurality of server computing devices, the HTAP database comprising:

an online transaction processing (OLTP) engine;

an online analytical processing (OLAP) engine provided separately from the OLTP engine; and a shared storage holding data of multiple tenants, the shared storage comprising:

an OLTP storage holding data in row format for responding to queries of the OLTP engine, the OLTP storage including:

a log store configured to persist logs; and a page store configured to store versions of data pages and apply the logs to construct current versions of the data pages; and an OLAP storage holding data in column format for responding to queries of the OLAP engine, the OLAP storage including:

a delta store configured to record changes made to the OLTP storage; and a base store configured to implement updates from the delta store in persistent storage; and a replication framework configured to perform log shipping of the logs from the log store to the delta store, wherein the shared storage is configured to:

receive a request for a first scan from a first tenant and a request for a second scan from a second tenant;

execute the first scan;

after a predetermined first period of time has elapsed without the first scan finishing, pause the first scan and execute the second scan;

upon detecting that memory usage of the shared storage is above a first threshold, pause the log shipping from the log store to the delta store; and upon detecting that memory usage of the shared storage is above a second threshold, perform an urgent flush of data from the logs in the delta store to the base store and clear the logs from the delta store.

19. The method of claim 11, further comprising storing at least one column index in the shared storage.

20. The method of claim 11, further comprising:

receiving a request for a first predicate pushdown and a request for a second predicate pushdown; and determining an evaluation order of the first and second predicate pushdowns according to set rules.

* * * * *